Figure 1:
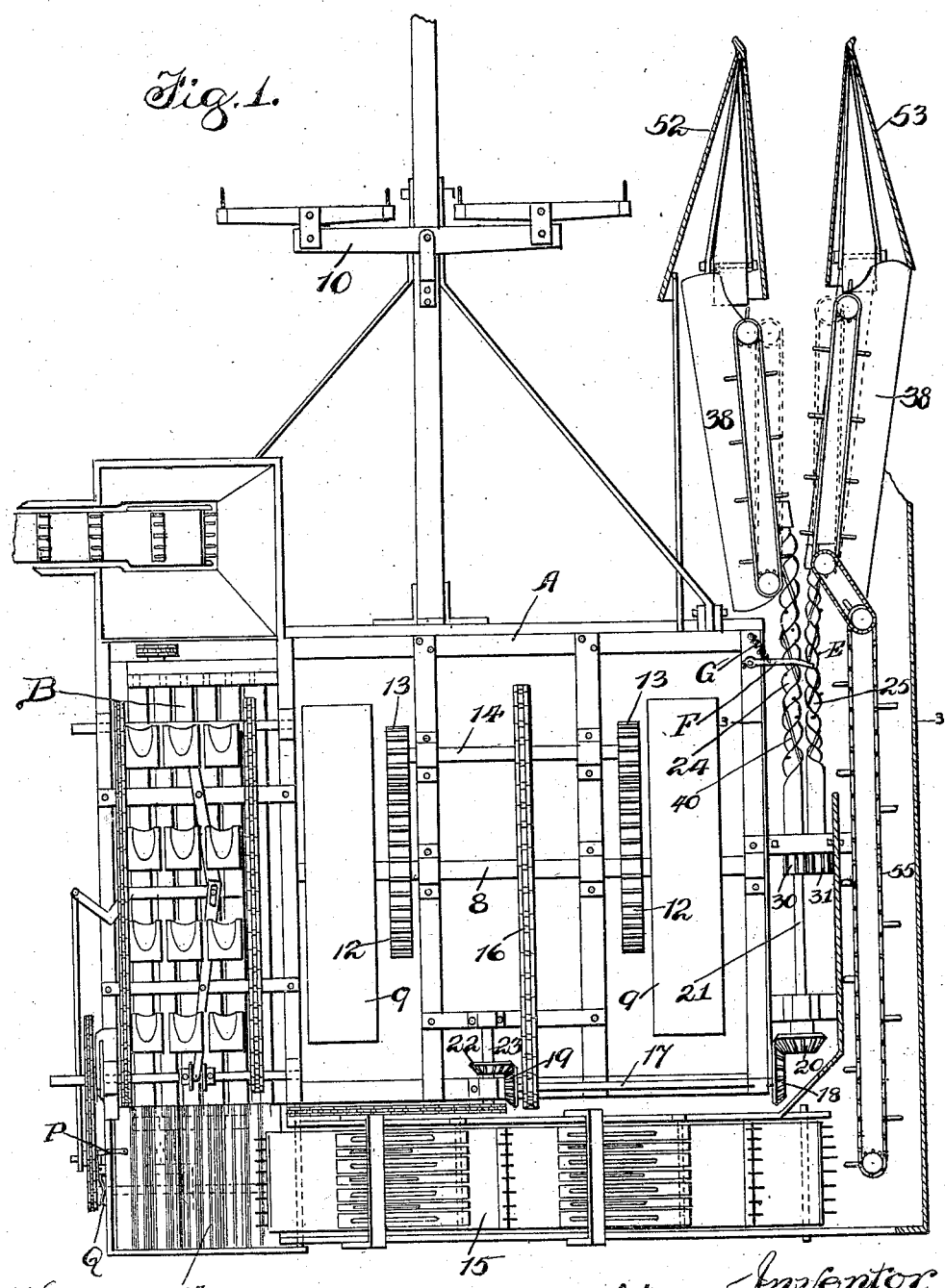

No. 841,822. PATENTED JAN. 22, 1907.
H. STEINER.
CORN HARVESTING AND HUSKING MECHANISM.
APPLICATION FILED JAN. 3, 1902.

3 SHEETS—SHEET 1.

Witnesses
JB Weir
E. C. Semple

Inventor
Henry Steiner
By Brown & Darby
Attys

No. 841,822. PATENTED JAN. 22, 1907.
H. STEINER.
CORN HARVESTING AND HUSKING MECHANISM.
APPLICATION FILED JAN. 3, 1902.
3 SHEETS—SHEET 2.
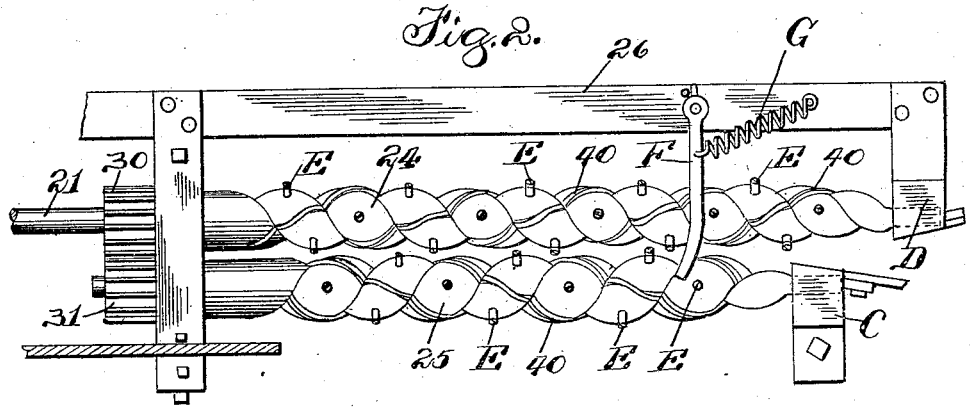
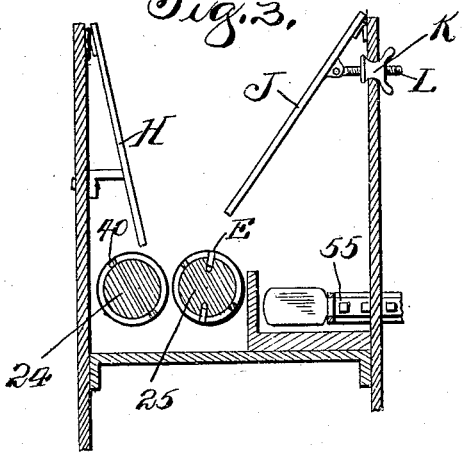
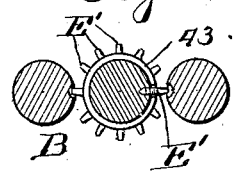
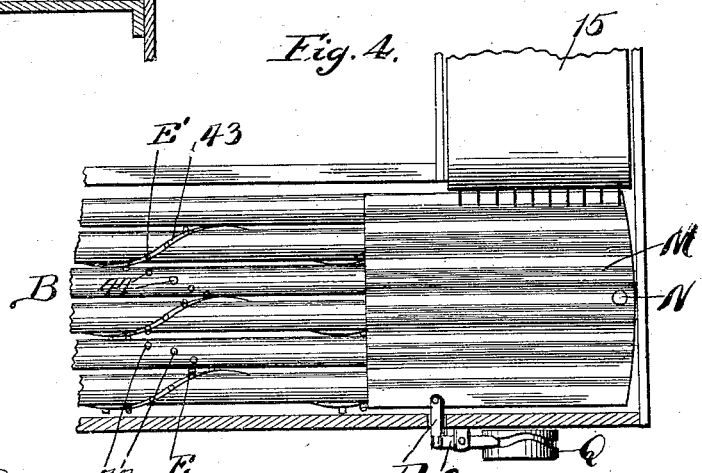
Witnesses
JB Weis
E. C. Semple
Inventor
Henry Steiner
By Mason & Darby
Att'ys

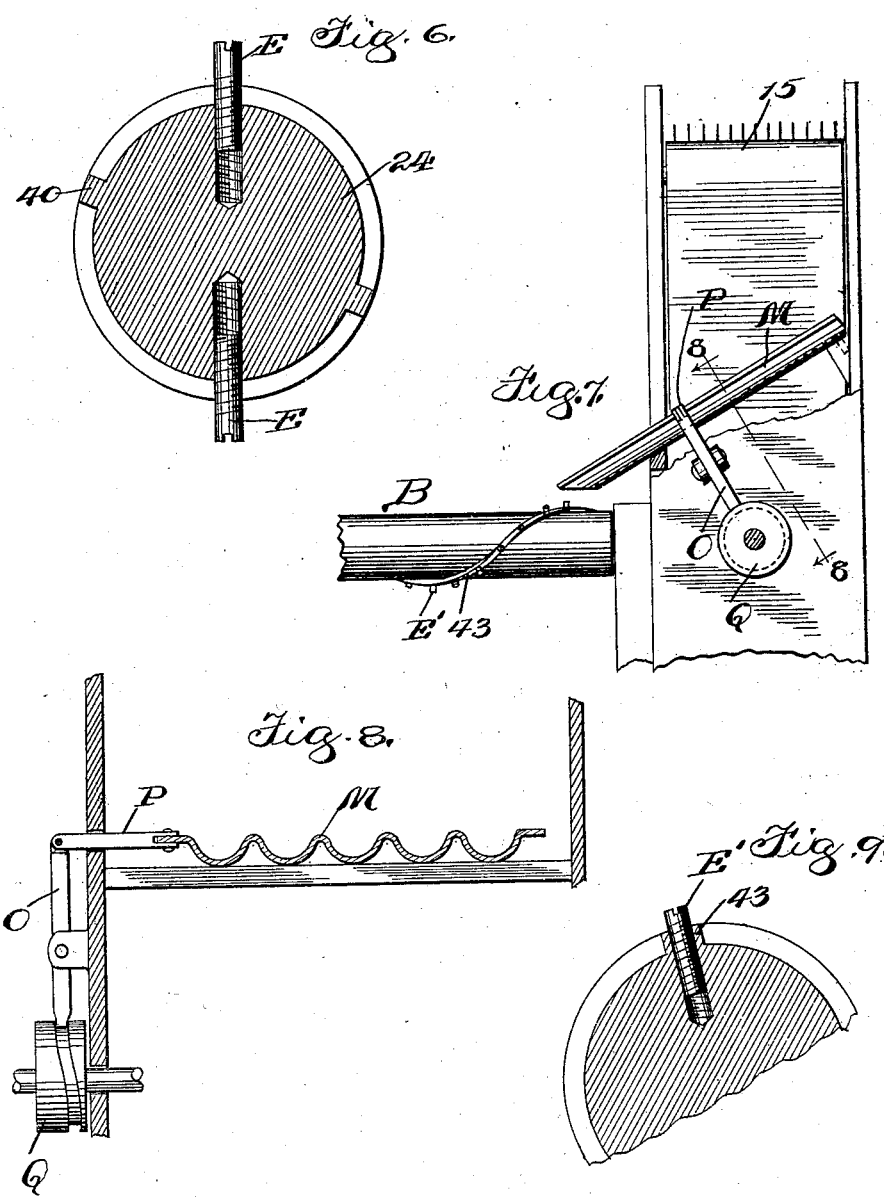

UNITED STATES PATENT OFFICE.

HENRY STEINER, OF HOMEWOOD, ILLINOIS, ASSIGNOR TO AUGUST STEINER, OF HOMEWOOD, ILLINOIS.

CORN HARVESTING AND HUSKING MECHANISM.

No. 841,822.　　　　Specification of Letters Patent.　　　　Patented Jan. 22, 1907.

Application filed January 3, 1902. Serial No. 88,350.

*To all whom it may concern:*

Be it known that I, HENRY STEINER, a citizen of the United States, residing at Homewood, in the county of Cook and State of Illinois, have invented a new and useful Corn Harvesting and Husking Mechanism, of which the following is a specification.

This invention relates to corn harvesting and husking mechanism, and embodies improvements in the details of construction and arrangement shown, described, and claimed in Patent No. 606,824, issued July 5, 1898, to August Steiner.

The object of the invention is to improve the construction and arrangement of details of the machine disclosed in said patent to render the same more efficient in operation The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in plan of a machine, showing the application thereto of constructions embodying the principle of my invention. Fig. 2 is a broken detail view, in top plan, of the snapping-rolls embodying in the details thereof improvements included within the scope of my invention. Fig. 3 is a detail view, in vertical transverse section, on the line 3 3, Fig. 1, showing the arrangement of guide-plates embodying the principles of my invention. Fig. 4 is a broken detail view in plan of the husking mechanism, showing the application and arrangement of shaker-plate embodying the principles of my invention. Fig. 5 is a view in transverse section of adjacent husking-rolls, showing the arrangement of adjustable pins therein. Fig. 6 is a view in transverse section of a snapping-roll, showing the adjustable pins. Fig. 7 is a broken detail view, in side elevation, of the construction shown in Fig. 4. Fig. 8 is a broken detail view in section on the line 8 8, Fig. 7, looking in the direction of the arrows. Fig. 9 is a transverse sectional view, parts broken off, of a husking-roll embodying my invention.

The same part is designated by the same reference-sign wherever it occurs throughout the several views.

Reference-sign A designates the framework of the machine, upon which the various parts, hereinafter described and referred to, are mounted. In this framework is suitably journaled the main driving-shaft 8, which may be rotated from any suitable source of power or upon which may be mounted the traction-wheels 9 and the draft appliances 10. The shaft 8 constitutes the main drive-shaft from which the various operating parts of the mechanism are driven.

Mounted upon shaft or axle 8 are gears 12, arranged to mesh with similar gears 13, mounted upon a counter-shaft 14, suitably journaled in the framework of the machine. Upon the shaft 14 is mounted a sprocket or other gear arranged to engage with and actuate a sprocket-chain or other suitable gearing 16, by which is driven a shaft 17, journaled in the framework. Gears 18 and 19 are mounted upon shaft 17 and are arranged to respectively engage and drive gears 20 and 22. The gear 20 is mounted upon a shaft 21, and gear 22 is mounted upon the drive shaft 23, from the latter of which is actuated the elevator or conveyer 15. The shaft 21 forms part of or is connected to one of a pair of snapping-rolls 24; 25, the other of said rolls, being driven therefrom through the intermeshing gears 30 31. The snapping-rolls 24 25 are suitably mounted in snapping-frame 26 and extend forwardly of the machine or in the direction of advance of the machine in the field.

Extending forwardly from the front end of the snapping-rolls 24 25 and somewhat divergent from each other are gathering chains or devices 38, and extending forwardly from the supports for said gathering devices are guiding toes or casings 52 53, said guiding toes or casings also being somewhat divergent from each other forwardly. Reference-sign 55 designates a carrier arranged adjacent and to one side of the snapping-rolls and adapted to receive the detached ears of corn therefrom and to deliver the same to or upon the elevator or carrier 15, from which the detached ears of corn are delivered upon the husking mechanism, (indicated generally by reference-sign B.)

In the main the construction and arrangement so far described is substantially the same as that shown and described in Patent No. 606,824, above referred to, and the specific details thereof need not be more specifically described herein.

In the practical operation of a machine embodying the construction above indicated I have found that dwarfed or imperfect ears of corn, or nubbins, and which as a general rule occur on the stalk of corn close down to the ground, frequently become wedged in between the forward ends of the snapping-rolls, thereby clogging the machine and preventing the efficient feed and operation thereof. This objection has been encountered in the practical working and operation of the machine in the field, and the first feature of my invention relates to means for preventing the clogging of the machine and of the snapping-rollers by the small dwarfed ears or nubbins of corn becoming wedged in between the forward ends of the snapping-rolls. In accomplishing this object I make one of the snapping-rolls of greater length than the other, as clearly shown in Fig. 2, the forward ends of said rolls 24 25 being journaled in boxes C and D.

As shown, the box D of roller 24 is in advance of box C, in which is journaled the forward end of roll 25. Consequently instead of having the two boxes C and D located directly opposite with respect to each other the box C is presented opposite a revolving surface of the other roll. Therefore when a nubbin or dwarfed ear becomes lodged between the forward ends of the rolls the revolving rib or corrugated surface of roll 24, operating against the smooth, plain, or fixed adjacent surface of box C, effects a crushing and breaking up of the nubbin or dwarfed ear and permits the same to drop through or between the rolls, thereby avoiding clogging of the operation of the machine.

As set forth in the patent above referred to, the snapping-rolls are longitudinally corrugated spirally and are also provided with ribs 40, said ribs running in reverse direction with respect to the spiral corrugations of the rolls. I have found in the practical operation of a machine employing such snapping-rolls, and particularly where the corn is dry and brittle, a tendency is developed to choke and clog the machine by reason of the failure of the rolls to effect an efficient feed of the cornstalks and fodder or leaves through and between the rolls, such fodder, stalks, and the like accumulating upon and between the rolls and not being gripped or grasped sufficiently between the rolls to be fed therethrough. The next feature of my invention relates particularly to means for overcoming this objection, and I accomplish the desired object by providing pins or projections E in the surface of the snapping-rolls. These pins or projections may be in the form of threaded plugs and are received in threaded seats or sockets formed in the bodies of the rolls. Thus the pins or projections may be adjustable as to the extent of their projection beyond the surface of the rolls, as in the case of wet or damp corn I have found that such projections or pins are not necessary, as the surfaces of the rolls in such case are enabled to efficiently grasp or grip the stalks, fodder, and the like of the corn and feed the same through and between the rolls.

If desired, the pins or projections E may be constructed to receive a suitable tool by which they may be turned into or out of their threaded sockets in the rolls, thus affording means for quickly adjusting the degree of projection thereof to accommodate or suit any desired condition of dryness in the material operated upon. In practice I arrange the pins or projections E in spiral rows substantially parallel with the ribs 40 and in such relative positions as that the pins or projections on one roll will coöperate with the ribs on the adjacent roll to effect a biting or gripping action on the fodder, cornstalks, or the like when the rolls are relatively rotated, thereby effecting a most efficient feed of the material through and between the rolls and preventing clogging of the operation.

I have found in the operation of a corn harvesting and husking mechanism in the field that it is desirable to regulate the height of the ear-snapping rolls to suit the average height of the cornstalks. In some localities and under some conditions of cultivation the cornstalks grow to greater height than in other localities and under other conditions of cultivation, and inasmuch as the good ears of corn usually grow near the top of the stalks it is desirable to elevate the snapping-rolls as much as possible in order to avoid the necessity of feeding too great a length of stalk through and between the snapping-rolls to effect a detachment of the ear. At the same time it is desirable to so set the apparatus as to be able to pick up any bent-over or fallen stalks as the machine proceeds through the field, and to accomplish both these results it is necessary to depress or downwardly and forwardly incline the toes or casings 52 53, the gathering mechanism, and the snapping-rolls. The mechanism for accomplishing these results and the arrangement permitting the same are fully set forth in the patent above referred to. When, however, the snapping-rolls are adjusted to any considerable height of corn and inclined forwardly and downwardly, as above set forth, I have found that the ears of corn when detached from the stalks are inclined to fall forwardly or slide down the snapping-rolls, and thus be dropped on the ground and lost. The next feature of my present invention is to provide means for preventing this loss. This result I accomplish by mounting upon a convenient part of the framework 26, which supports the snapping-rolls, a hinged or pivoted or otherwise tilting gate F. In the particular form shown as embodying this feature of my invention this gate is arranged to extend across and above the snapping-rolls and is yieldingly held in position to form a stop for the detached ears in any convenient manner—as, for instance, by means of a spring G, which permits, however, the yielding of said gate or guard to enable a stalk of corn to be drawn into or between the rolls as the machine advances through the field. In this manner the loss of ears of corn by sliding down or lengthwise of the snapping-rolls is prevented and the ears are retained upon the snapping-roll until they are finally deposited or transferred therefrom into position to be engaged by the carrier or conveyer 55, by which the detached ears are delivered to the elevator 15 and thence to the husking-rolls.

I have found that the stalks of corn frequently become broken and fall over or are forced upon the conveyer or carrier 55 and are carried with the detached ears to the husking mechanism. Not only is this objectionable, but the breaking of the stalks before being fed through and between the snapping-rolls also results in clogging up the machine and preventing the same from efficiently performing its work of detaching the ears. This objection I have found to be greater in the case of very dry corn than in the case where the corn is damp or wet, as in dry corn the stalks are brittle and easily broken at the joints. The next feature of my invention contemplates the provision of means for preventing this trouble. This result I accomplish by arranging suitable guard-plates or shields H J over the snapping-rolls, the purpose of which is to maintain the cornstalks in vertical or upright position as much as possible, so as to be properly and quickly fed through and between the snapping-rolls, and to prevent, in case of breakage of the stalks at the joints, the upper part from falling over upon the conveyer or carrier 55. If desired, one or both of the shield-plates H J may be made adjustable toward and from the other. I have shown the plate J made adjustable toward and from plate H—as, for instance, by means of the nut K, operating upon a threaded bolt L, suitably connected to said plate J. It is to be understood, however, that the plate J, which occurs next adjacent the carrier or conveyer 55, should terminate at a sufficient height above the surface of the snapping-rolls as to afford space for the ready passage of the ears of corn from the snapping-rolls to said conveyer, as most clearly indicated in Fig. 3.

After the ears have been detached by the snapping-rolls they are delivered by carrier 55 to the elevator 15 and to the husking mechanism B. In order to efficiently remove the husks of the ears when delivered to the husking mechanism quickly, it is desirable that the ears be delivered to the husking mechanism in proper position for the husking mechanism to perform its function. The next feature of my present invention relates particularly to means for regulating the delivery of the ears of corn and in proper relative position with respect to the husking mechanism for the husks to be quickly removed therefrom. As explained in the patent above referred to, the husking mechanism comprises husking-rolls arranged in pairs and having spiral ribs 43 on one member of each pair and pins or projections 44 on the other and coöperating member of each pair, and in accordance with my present invention I purpose to provide means for depositing the detached ears in longitudinal relation with respect to the length of the pairs of husking-rolls and between coöperating pairs of such rolls. This result I accomplish by means of a shaker-plate M, (see Figs. 4, 7, and 8,) arranged in inclined relation at the delivery end of elevator 15, upon which the detached ears are delivered by said elevator and by which said ears are guided down to and deposited upon the husking-rolls. This shaker-plate is hinged or pivoted in any suitable manner, preferably upon a vertical axis, and at the upper end thereof, as indicated at N, Fig. 2, an oscillatory movement may be imparted thereto in any convenient manner—as, for instance, by means of a lever O, connected by link P to said shaker-plate, said lever O being rocked in any suitable manner—as, for instance, by means of a cam Q, suitably driven from any convenient rotary part of the machine. This oscillatory movement imparted to the shaker-plate M shakes the detached ears of corn into proper position and serves to deliver said ears upon the husking-rolls in suitable relation thereto for said rolls to quickly and efficiently perform their function of removing the husks therefrom.

In order to facilitate the shaking of the ears of corn into proper relation with respect to the husking-rolls, I prefer to corrugate said shaker-plate, so that in case an ear is delivered crosswise of said plate the shaking motion imparted thereto will cause the ear to eventually find lodgment in a hollow or groove of said plate and to be shaken down in this position upon the receiving ends of the husking-rolls, said hollows or grooves delivering in proper relation to the husking-rolls. In this manner the ears are properly delivered upon and to the husking mechanism and in suitable relation with respect thereto to be efficiently and quickly stripped of their husks.

I have found, and particularly with dry corn, that in the ribbed and pin construction of the coöperating husking-rolls as disclosed in the patent above referred to the husking mechanism does not always efficiently remove the husks from the ears. This, as above indicated, is particularly true in the case of dry corn and is not so marked in the case of wet or damp corn. In order to provide means for effecting a quick removal of the husks from the ears in the case of dry corn, as well as in the case of damp or wet corn, I purpose to employ adjustable pins or projections E' in the husking-rolls and similar in the specific details of construction thereof to the adjustable pins or projections E, above described with reference to the snapping-rolls, except that in the case of the husking-rolls these adjustable pins or projections are mounted in the ribs 43. In this manner I am enabled to adjust or regulate the degree of projection or extension of the pins or projections beyond the surface of the ribs on the husking-rolls to accommodate any character of corn.

I have not attempted in the foregoing description to go into the specific details of construction of the machine nor into the mode of operation thereof, as these matters are fully set forth in the patent above referred to and form no part of my present invention.

While I have described specific constructions in the various features of my invention, I desire to be understood as not limiting myself thereto, as variations and changes in the details thereof would readily occur to persons skilled in the art and still fall within the spirit and scope of my invention.

What I claim as new and useful and of my own invention, and desire to secure by Letters Patent, is—

1. In a machine of the class described, snapping-rolls having rounded spirally-corrugated surfaces adapted to mesh one with the other, in combination with adjustable pins mounted in the raised parts of said spirally-corrugated surfaces of one or the other or both of said rolls, as and for the purpose set forth.

2. In a machine of the class described, snapping mechanism comprising rolls having rounded spirally-corrugated surfaces and spiral ribs projecting therefrom, in combination with pins or projections arranged in the raised parts of said surfaces, as and for the purpose set forth.

3. In a machine of the class described, snapping-rolls having spirally-corrugated surfaces and spiral ribs, in combination with pins or projections arranged in the raised parts of said corrugated surfaces and in rows substantially parallel with said ribs, as and for the purpose set forth.

4. In a machine of the class described, snapping-rolls, in combination with shield-plates arranged thereover, and means for adjusting one of said plates toward and from the other to vary the inclination thereof, as and for the purpose set forth.

5. In a machine of the class described, snapping-rolls for detaching ears of corn from the stalks, a conveyer for receiving the detached ears, and shield-plates arranged over said snapping-rolls to prevent the stalks from falling upon said conveyer, one of said shield-plates being adjustable toward and from the other to vary the inclination thereof, as and for the purpose set forth.

6. In a machine of the class described, the combination with solid, corrugated snapping-rolls arranged longitudinally with respect to the direction of motion of the machine and being of different lengths, and means for rotating said rolls in opposite directions, of a rigid abutment arranged opposite the operative face of the longer one of the rolls and contiguous to the end of the shorter roll for receiving the impact of an ear which might become lodged between the rolls, and thereby serving to crush such ear.

7. In a machine of the class described, the combination with solid, ribbed snapping-rolls arranged longitudinally with respect to the direction of motion of the machine, and projecting one in advance of the other at their forward ends, and means for rotating said rolls in opposite directions, of a rigid abutment arranged opposite the operative face of the longer one of the rolls and contiguous to the end of the shorter roll for receiving the impact of an ear which might become lodged between the rolls, and thereby serving to crush such ears, one of said rolls being tapered contiguous to said abutment.

8. In a machine of the class described, the combination with snapping-rolls arranged longitudinally with respect to the direction of motion of the machine and projecting one in advance of the other at their forward ends, and means for rotating said rolls in opposite directions, of a rigid abutment arranged opposite the operative face of the longer one of the rolls and contiguous to the end of the shorter roll for receiving the impact of an ear which might become lodged between the rolls, and thereby serving to crush such ear, said abutment being inclined with respect to the length of the rolls with its forward end deflected outwardly from the line of movement of the machine.

9. In a machine of the class described, the combination with solid, corrugated snapping-rolls arranged longitudinally with respect to the direction of motion of the machine and projecting one in advance of the other at their forward ends, the forward ends of both of said rolls being tapered, and means for rotating said rolls in opposite directions, of a rigid outwardly-deflected abutment arranged opposite the operative face of the longer one of the rolls and contiguous to the end of the shorter roll for receiving the impact of an ear which might become lodged between the rolls, and thereby serving to crush such ear.

In witness whereof I have hereunto set my hand, this 18th day of December, 1901, in the presence of the subscribing witnesses.

HENRY STEINER.

Witnesses:
    E. C. SEMPLE,
    S. E. DARBY.